(No Model.)
W. H. GOODWIN.
TAP.
No. 272,425. Patented Feb. 20, 1883.
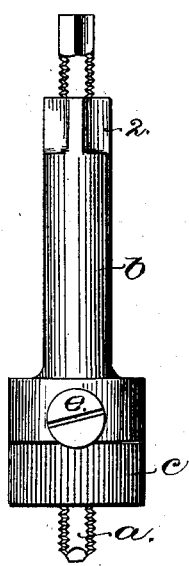
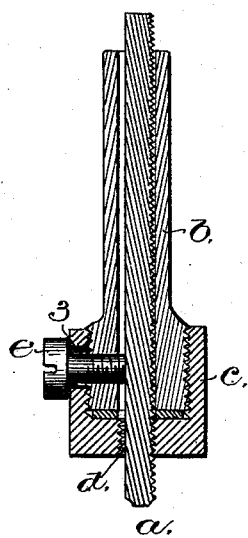
Witnesses
John T. C. Prinkert
Fred A. Powell
Inventor:
William H. Goodwin
by Crosby & Gregory
Attys.

UNITED STATES PATENT OFFICE.

WILLIAM H. GOODWIN, OF BOSTON, ASSIGNOR OF ONE-HALF TO THOMAS A. WATSON, OF EVERETT, MASSACHUSETTS.

TAP.

SPECIFICATION forming part of Letters Patent No. 272,425, dated February 20, 1883.

Application filed September 4, 1882. (No model.)

*To all whom it may concern:*

Be it known that I, WILLIAM H. GOODWIN, of Boston, county of Suffolk, and State of Massachusetts, have invented an Improvement in Taps, of which the following description, in connection with the accompanying drawings, is a specification.

Taps for cutting internal threads have usually consisted of a rod of steel having a cutting portion at the end of an unthreaded shank portion, which is usually squared or otherwise suitably formed to be held by a chuck or wrench. When a tap of this construction breaks in using, it generally happens that the greater part of the threaded or cutting portion breaks off and the entire tap is rendered useless.

My present invention has for its object to make the threaded or cutting portion independent of the shank portion, which may be termed the "tap-holder," the said threaded or cutting portion consisting of a rod of substantially the same diameter and threaded or provided with thread-cutting teeth throughout the main part of its length. The tap-holder consists of a tubular shank, through which the said threaded cutting portion is passed, a sufficient portion projecting at the end of the said tubular shank to cut the depth of thread required, so that the said tubular shank also serves as a gage to regulate the depth to which the tap may enter the article in which the threads are being cut. The said tubular shank or holder is adapted to be mounted in the usual chuck or wrench, and the threaded cutting portion may be held in the proper position therein by a set-screw or equivalent clamping device. In a tap of this construction the projecting portion only of the tap proper is likely to be broken off, and when so broken the remaining portion can be removed from the tubular shank, properly sharpened again at its point, and then inserted in the shank and used as before. In this way the tap is made useful until the entire threaded portion has been worn out, and then the shank or holding portion can be used over again with a similar threaded or cutting portion. In order to enable the tap proper to be easily removed from the tubular shank or holder when broken, the said shank is made, as shown, in two portions, the portion through which the cutting end of the tap proper projects being made as a nut, threaded to fit the threads of the said tap, and the remaining portion of the shank, which is free to slide longitudinally on the cutting portion of the tap, being screwed into the said nut, and held in proper position therein by the same set-screw which clamps the tap proper.

Figure 1 is a side elevation of a tap constructed in accordance with this invention, and Fig. 2 a longitudinal section thereof.

The tap proper or cutting portion, *a*, is shown as a rod of substantially uniform diameter, and provided with cutting threads or teeth throughout nearly its entire length, as shown. The said cutting portion or tap proper, *a*, is mounted in the tubular shank *b*, squared at its end, as shown at 2, or otherwise adapted to be held in a chuck or wrench of the usual construction. The said shank *b* is preferably provided with a nut, *c*, screwed upon the end thereof, and provided with internal threads, *d*, fitted to the threads of the tap proper, *a*. The said tap proper, *a*, is turned or screwed down through the threads *d* until the proper amount projects to cut threads to the depth desired, the said nut *c* of the shank thus operating as a gage to limit the depth of the cut of the tap. The tap *a* is then prevented from rotary movement relative to its shank *b* by any suitable clamping device, as the set-screw *e*, which passes through an opening, 3, in the nut *c*, and thus locks the said nut *c* upon the remaining portion *b* of the shank. When the cutting portion *a* of the tap breaks, it will usually be only that part which projects beyond the threads *d* which breaks off from the remaining portion, and the break will always occur at some point between the projecting end of the tap and the point engaged by the said screw *e*. In case the projecting end should break just within the threads *d*, and the remaining portion of the tap proper, *a*, did not project beyond the end of the shank *b*, it would be difficult to remove the said main portion from the threads *d* if the portions *b* and *c* of the shank were not readily separated, as shown. After the end of the tap has been broken off the remaining portion may be removed from the shank, properly sharpened or pointed, and again inserted, so that the tap may be used until the entire cutting portion *a* is worn out or used up. The upper end of the cutting portion *a* of the tap is shown in Fig. 1 as unthreaded for a short distance, this being the part by which it was held in the process of making the cutting teeth or threads on the remaining portion.

I claim—

1. The combination, with the cutting portion or tap proper, of the independent tubular shank and clamping device, whereby the said cutting portion is fastened in the desired position in the said shank, substantially as and for the purpose described.

2. The combination, with the tubular shank, of the nut mounted thereon, and provided with internal threads fitted to the threads of the cutting portion of the tap, substantially as and for the purpose described.

3. The combination of the cutting portion *a*, the tubular shank *b*, and nut *c*, mounted on the said shank, and threaded to fit the said cutting portion, and the clamping-screw whereby the said parts are fixed in the proper relative position, substantially as and for the purpose set forth.

In testimony whereof I have signed my name to this specification in the presence of two subscribing witnesses.

WM. H. GOODWIN.

Witnesses:
BERNICE J. NOYES,
JOS. P. LIVERMORE.